Feb. 5, 1929.
H. LUMMERZHEIM
DEVICE FOR MEASURING THE INTERVALS BETWEEN
PERFORATIONS IN REGULAR SERIES THEREOF
Filed Aug. 23, 1927
1,701,048
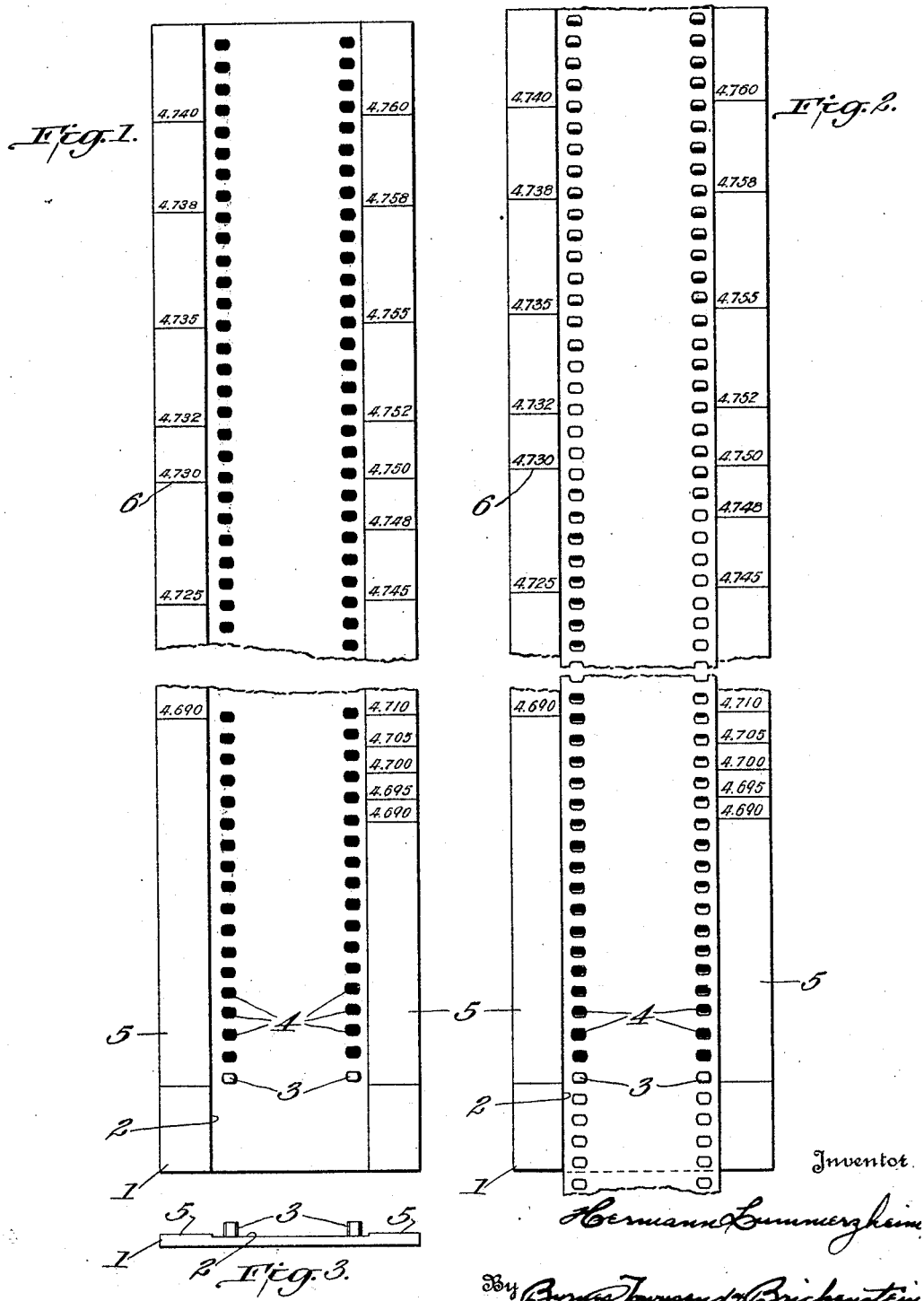

Patented Feb. 5, 1929.

1,701,048

UNITED STATES PATENT OFFICE.

HERMANN LUMMERZHEIM, OF DESSAU-ZIEBIGK, GERMANY, ASSIGNOR, BY MESNE ASSIGNMENTS, TO AGFA ANSCO CORPORATION, OF BINGHAMTON, NEW YORK, A CORPORATION OF NEW YORK.

DEVICE FOR MEASURING THE INTERVALS BETWEEN PERFORATIONS IN REGULAR SERIES THEREOF.

Application filed August 23, 1927, Serial No. 214,938, and in Germany December 14, 1926.

In the cinematographic art it is highly important to determine the exact distance between any two adjacent perforations of the rows of perforations of a cinematographic film.

While, with the use of the modern perforating machines, it is very easy to obtain great uniformity in the intervals between perforations, there is no way in which this uniformity may be later relied upon, because of the fact that during storage and subsequent handling and treatment the film is subject is shrinkage.

Therefore, when the film is used, it is highly desirable to have some means whereby the interval between perforations, or the so-called "step" may be as quickly and accurately determined as possible.

Heretofore, so far as I am aware, the measuring of this interval has generally been accomplished by measuring the distance between two relatively remote perforations, say the first and the forty-first, and then dividing the value thus obtained by the number of perforations, in this case forty. This will give the average distance between any two perforations. Since, in measuring the interval between any two adjacent perforations, an accuracy of 0.01 mm., or, if possible, 0.001 mm. is required, the measurement of a length of film embracing forty perforations must be accurate to a few hundredths of a millimeter. This requires a measuring instrument which permits a parallax-free reading with the aid of a line graduation combined with a micrometer screw or an accurate vernier.

I have devised an instrument for accurately determining the perforation-interval or "step" of any given film, which is simpler and easier to use, even in the hands of the unskilled worker, than any device heretofore employed, but which, nevertheless, is decidedly accurate.

This instrument makes use of the standard size (lengthwise of the film) of perforation, which in ordinary cinematographic films, shrinkage considered, lies between 2.00 mm. and 1.98 mm., and the mode of operation of the instrument is based upon the interference principle, whereby it is possible to compare the perforation-interval of an unknown series of perforations with the interval of a known series by superposition of one upon the other in such manner that the first perforations of each series exactly register. By this means it is apparent that if the perforation-intervals of the two series differ, the corresponding successive perforations of the two series will become more and more out of register as they become more and more distant from the first two which are in exact register, until finally the far edge of a perforation of one series exactly overlies the near edge of a perforation of the other series. This is the interference mark or point and is easily recognized and is used for taking readings. The distance of this mark or point from the first or registering perforations of the two series can be measured, and the perforation-interval or "step" of one series being known, the perforation-interval or "step" of the other series can be calculated.

In the accompanying drawings, I have illustrated an instrument suitable for measuring the perforation-interval of films in accordance with the principle set forth.

In these drawings,

Fig. 1 is a fragmentary plan view of the instrument;

Fig. 2 is a view similar to Fig. 1, but showing a film mounted thereon; and

Fig. 3 is an end view of the instrument.

In manufacturing an instrument of the type illustrated, I take a strip 1 of wood, metal, or other suitable material having a length of about 300 mm. and a width of about 50 mm., and form therein, parallel with its edges, a longitudinal depression 2 having a width of about 35 mm., the usual width of cinematographic film, and a depth of about 1 mm. Adjacent to one end of the strip and within the depression I attach two pins 3 whose size, cross-sectional contour and distance correspond exactly with the size and shape of the perforation holes and with the distance apart of the two rows of perforations of a standard film.

Arranged in longitudinal alignment with each of the pins 3 is a row of marks 4, exactly corresponding in size and shape with the size and shape of the film perforations and spaced at a uniform distance from each other. These marks 4 are preferably made black, and the bottom of the depression upon which they are placed may be white to present a striking contrast which facilitates reading. As is apparent from an inspection of Fig. 1, the depression 2, with the pins 3 and marks 4, presents an appearance similar to that of a film.

Upon the portions 5 of the strip 1 flanking the depression 2, I provide suitably designated graduations, as shown, these graduations bearing a definite relationship to the marks 4.

The indices for the graduations indicate the perforation-intervals of various films whose interference points fall at the points of the graduations, and are determined by computation from the known interval S and width $w$ (measured along the series) of the marks 4. At the interference point the length of a film strip of N steps differs from the length of N steps on the instrument by the width of one mark. The interval $S'$ of the film perforations is determined by the equation:

$$S' = S - \frac{w}{N}$$

if $S' < S$, as shown in Fig. 2.

For example, if the marks 4 are 2 mm. wide and their spacing is 4.770 mm., a film with a perforation-interval of 4.730 mm. is placed upon the instrument with two of its perforations engaged by the pins 3, the hereinbefore described interference point lies at a distance of 238.50 mm. from the outer edges of the pins 3. At this point I place a graduation and indicate it by the number 4.730, as shown at 6. The position of such a film upon the instrument is shown in Fig. 2.

The accuracy of the reading of the instrument so graduated is apparent from the fact that the graduation for the interference point of a film, the perforation-interval of which is 4.732 mm., lies 1.69 mm. farther along the scale of graduations. Thus, 1.69 mm. on this portion of the scale corresponds with a difference in perforation-interval of 0.002 mm. It will be seen, therefore, that it is possible to read the instrument in thousandths of a millimeter.

As will be apparent, particularly by reference to the drawings, the accuracy of the instrument is the greater the farther the interference point lies from the pins 3. In order to secure the most even accuracy for measuring perforation-intervals of from 4.700 mm. to 4.755 mm., inclusive, between which limits lie the intervals generally used for cinematographic films, it is advisable to provide, in addition to the scale of graduations shown at the left of Figs. 1 and 2, a scale of graduations based on a perforation-interval including 4.790 mm., as shown at the right of Figs. 1 and 2. With these two scales the desired accuracy in measuring is assured for all occurring perforation-intervals.

Other intermediate graduations may be placed upon the scales, but for present purposes the described graduations have proven adequate.

If the interference point falls between two graduations, it will be apparent that it can be obtained by interpolation and the perforation-interval of the film thus determined will be accurate within a few thousandths of a millimeter.

The above explanation has reference to the left-hand scale but a reading could also be made upon the right-hand scale, the graduations 4.730 and 4.732 appearing thereon also but not being shown because of the fact that they fall upon that portion of the instrument which is broken away.

It will thus be seen that I provide a very simple and inexpensive instrument for performing the desired measurement of the perforation-intervals of films with extreme accuracy and facility, it being necessary merely to position the film upon the instrument in engagement with the pins 3, then determine the interference point between the perforations and the marks 4, and then read the indices of the graduation adjacent to the point at which the interference falls.

Various changes are contemplated as within the principle of the invention and the scope of the following claims.

I claim:—

1. A device for measuring the intervals between perforations in regular series thereof, as in cinematographic films, which comprises a member bearing a series of marks arranged at regular predetermined intervals, and means for positioning a film in predetermined relation to said marks whereby the relative spacing of the marks and the film perforations may be observed, said member being provided with graduations bearing a definite relation to the spacing of the film perforations and to said marks, whereby the distance between film perforations may be determined.

2. A device for measuring the intervals between perforations in regular series thereof, as in cinematographic films, which comprises a member bearing a series of marks similar in shape and size to the film perforations and spaced from each other at regular predetermined intervals, and means for positioning a film in predetermined relation to said marks so that the point of interference between said marks and the film perforations may be observed, said member being provided with a scale of graduations bearing a definite relation to said marks and to the spacing of the film perforations as indicated by said interference point, whereby the distance between film perforations may be determined.

3. A device for measuring the intervals between perforations in regular series thereof, as in cinematographic films, which comprises a member having a film-receiving depression provided with a series of marks of a shape and size similar to the perforations of said film and regularly spaced apart at predetermined intervals, pins carried by said member in predetermined relation to said marks and adapted to position the film so that the point of interference between said marks and the film perforations may be observed, said member being provided adjacent to said depression with a scale of graduations bearing a definite relation to said marks and to the spacing of the film perforations as indicated by said interference point, and indices for the graduations of said scale whereby the distance between perforations of said film may be directly read.

In testimony whereof, I affix my signature.

HERMANN LUMMERZHEIM.